United States Patent Office 3,023,133
Patented Feb. 27, 1962

3,023,133
WELDING FLUXES
Wallace J. Lewis and Glenn E. Faulkner, Columbus, Ohio, assignors, by mesne assignments, to The Battelle Development Corporation, Columbus, Ohio, a corporation of Delaware
No Drawing. Filed Nov. 9, 1959, Ser. No. 851,546
6 Claims. (Cl. 148—26)

This invention relates to flux compositions suitable for use in submerged arc welding.

In submerged arc welding the flux, in the form of a dry free-flowing powder, is deposited in the path to be followed by the welding electrode in a depth sufficient to cover the end of the electrode. The furrow ploughed by the electrode is filled in by the free-flowing powder which thereby provides a protective blanket over the pool of molten metal formed in the weld area surrounding the tip of the electrode.

Suitable fluxes are commonly prepared by grinding and blending naturally occurring minerals, such as quartz and dolomite, or fused mixtures of compounds, such as metal silicates. The free-flowing properties of such powdery mixtures may be improved by mixing with a binder or by forming a frit.

This invention provides new and improved fluxes that make it possible to obtain much higher notch toughness in weldments made by the submerged arc method, without impairing other properties of the weld. In the past, submerged arc welding has been unsatisfactory in many applications because of the low notch toughness properties obtained. In some applications that otherwise would have been ideal for submerged arc welding, other welding methods have been used because of the need for high notch toughness properties. Submerged arc welding is an especially satisfactory process in the welding of relatively thick metal plates, but in many applications, such as bridge structures and submarine hulls made of high quality steels, submerged arc welding could not be used because a satisfactory flux was not available.

The present invention provides highly improved and useful fluxes for submerged arc welding, making possible weld metals having a high degree of notch toughness. The fluxes of this invention consist essentially of silicon dioxide, titanium dioxide, calcium fluoride; at least one material of the group sodium oxide and potassium oxide; and at least calcium oxide of the group calcium oxide, magnesium oxide, manganese oxide, and aluminum oxide. The group sodium oxide and potassium oxide preferably comprises about 1 to 16 weight percent of the composition; and the group magnesium oxide, calcium oxide, manganese oxide, and aluminum oxide preferably comprises about 40 to 60 weight percent of the composition and should include at least about 5 weight percent calcium oxide.

Useful flux compositions according to the invention may consist essentially of:

| Material | Weight percent | |
|---|---|---|
| | About | To |
| Sodium oxide | 0 | 14 |
| Potassium oxide | 0 | 12 |
| Magnesium oxide | 0 | 25 |
| Calcium oxide | 5 | 60 |
| Manganese oxide | 0 | 20 |
| Aluminum oxide | 0 | 15 |
| Silicon dioxide | 10 | 30 |
| Titanium dioxide | 1 | 15 |
| Calcium fluoride | 7 | 30 | wherein the total of sodium oxide and potassium oxide is about 1 to 16 weight percent and the total of magnesium oxide, calcium oxide, manganese oxide, and aluminum oxide is about 40 to 60 weight percent.

Preferred flux compositions may consist essentially of:

| Material | Weight percent | |
|---|---|---|
| | About | To |
| Sodium oxide | 0 | 14 |
| Potassium oxide | 0 | 12 |
| Magnesium oxide | 0 | 22 |
| Calcium oxide | 8 | 45 |
| Manganese oxide | 0 | 12 |
| Aluminum oxide | 0 | 12 |
| Silicon dioxide | 14 | 25 |
| Titanium dioxide | 1 | 8 |
| Calcium fluoride | 10 | 26 | wherein the total of sodium oxide and potassium oxide is about 1 to 14 weight percent and the total of magnesium oxide, calcium oxide, manganese oxide, and aluminum oxide is about 45 to 55 weight percent.

Examples of typical fluxes having compositions within the preferred range and the useful range set forth above are listed in the table below. Measurements were made at five temperatures, as listed in the table, of the notch toughness of welds made with each flux composition.

CHARPY-V NOTCH TOUGHNESS OF SUBMERGED ARC WELD METALS DEPOSITED WITH FLUXES OF THE PRESENT INVENTION

| Calculated Composition, Parts by Weight | | | | | | | | | Notch Toughness, ft.-lb. | | | | |
|---|---|---|---|---|---|---|---|---|---|---|---|---|---|
| $Na_2O$ | $K_2O$ | MgO | CaO | MnO | $Al_2O_3$ | $SiO_2$ | $TiO_2$ | $CaF_2$ | 70° F | 0° F | −40° F | −60° F | −80° F |
| 2.2 | 0.5 | 10 | 40 | 0 | 0 | 20 | 5 | 20 | 72 | 68 | 71 | 56 | 52 |
| 2.2 | 0.5 | 10 | 30 | 0 | 10 | 20 | 5 | 20 | 71 | 58 | 55 | 43 | 31 |
| 2.2 | 0.5 | 20 | 10 | 10 | 10 | 20 | 5 | 20 | 68 | 57 | 53 | 40 | 47 |
| 2.2 | 0.5 | 0 | 40 | 0 | 10 | 20 | 5 | 20 | 92 | 63 | 73 | 68 | 52 |
| 2.2 | 10.35 | 12.1 | 20.3 | 7.2 | 10.6 | 20 | 5 | 10 | 63 | 55 | 48 | 45 | 42 |
| 12.2 | 0.35 | 12.1 | 20.3 | 7.2 | 10.6 | 20 | 5 | 10 | 65 | 51 | 48 | 45 | 41 |
| 2.2 | 0.35 | 12.1 | 20.3 | 7.2 | 10.6 | 20 | 5 | 20 | 56 | 48 | 47 | 45 | 35 |
| 2.2 | 0.35 | 12.1 | 20.3 | 7.2 | 10.6 | 22 | 3 | 20 | 55 | 42 | 41 | 40 | 33 |
| 2.2 | 0.35 | 12.1 | 20.3 | 7.2 | 10.6 | 14 | 5 | 26 | 67 | 49 | 44 | 39 | 31 |
| 2.2 | 0.35 | 12.1 | 20.3 | 7.2 | 5.6 | 22 | 8 | 20 | 65 | 50 | 44 | 36 | 25 |
| 2.2 | 0.35 | 12.1 | 20.3 | 7.2 | 10.6 | 24 | 1 | 20 | 49 | 48 | 35 | 30 | 25 |
| Comparison: Commercial flux (Linde No. 80) | | | | | | | | | 35 | 23 | 18 | 16 | 15 |

In preparing the fluxes listed in the above table, the batches were weighed, mixed and then melted in "0" size crucibles in a pot furnace. All compositions were fritted by quenching in water. The time of smelting was approximately 90 minutes and the smelting temperature was approximately 2300° F. After fritting, the fluxes were baked at 200° F. to 300° F. to drive off any moisture. Thereafter, the flux compositions were ground to minus 65 mesh for use in welding. The fluxes were tested in welds made in a one-half inch thick HY-80 plate, using a 3/32-inch diameter A-632 filler wire. HY-80 steel comprises about 0.17 weight percent carbon, about 0.30 weight percent manganese, about 0.19 weight percent silicon, about 0.018 weight percent phosphorus, about 0.023 weight percent sulfur, about 2.92 weight percent nickel, about 1.16 weight percent chromium, about 0.24 weight percent molybdenum, about 0.04 weight percent copper, and the balance essentially all iron. A-632 filler wire comprises about 0.08 weight percent carbon, about 1.36 weight percent manganese, about 0.55 weight percent silicon, about 0.010 weight percent phosphorus, about 0.022 weight percent sulfur, about 0.40 weight percent molybdenum, about 0.16 weight percent vanadium, about 1.33 weight percent nickel, and the balance essentially all iron.

The welding conditions were: (a) 440 amperes, (b) 30 arc volts, (c) 17.6 inches per minute travel speed, and (d) 250° F. preheat and interpass temperature. Standard submerged arc welding equipment was used. Weld metal notch toughness tests were made on the welds in the as-welded condition. Standard Charpy-V notch toughness bars were machined and impact tests were performed to rate notch toughness of the welds.

Results of welds in the HY-80 plate as well as on other steels tested were favorable. Other filler wires were tested and these results also were satisfactory. Using the preferred fluxes of the present invention, weldments were generally 30 to 40 foot-pounds better in the Charpy notch toughness tests than with the best available commercial fluxes. Even the less satisfactory fluxes in the broader useful range of compositions of the present invention provided approximately 10 to 25 foot-pounds higher notch toughness at the temperatures of the tests than did the best commercial fluxes.

All of the tests were made using standard submerged arc welding procedures familiar in the art. In the tests, the uses made of the new fluxes were similar to those currently being made of commercial fluxes. While superior notch toughness properties were obtained with the fluxes of the present invention, the other useful properties such as tensile strength, ductility, and yield strength were at least as good as can be obtained with commercial fluxes.

It is apparent, therefore, that the present invention provides novel, improved fluxes suitable for use in submerged arc welding to obtain superior notch toughness and thus to make it possible to achieve the advantages of submerged arc welding while avoiding the major disadvantage that has been encountered when other fluxes were used.

What is claimed is:

1. A flux suitable for use in submerged arc welding consisting essentially of:

| Material | Weight percent | |
|---|---|---|
| | About | To |
| Sodium oxide | 0 | 14 |
| Potassium oxide | 0 | 12 |
| Magnesium oxide | 0 | 25 |
| Calcium oxide | 5 | 60 |
| Manganese oxide | 0 | 20 |
| Aluminum oxide | 0 | 15 |
| Silicon dioxide | 10 | 30 |
| Titanium dioxide | 1 | 15 |
| Calcium fluoride | 7 | 30 | wherein the total of sodium oxide and potassium oxide is about 1 to 16 weight percent and the total of magnesium oxide, calcium oxide, manganese oxide, and aluminum oxide is about 40 to 60 weight percent.

2. A flux suitable for use in submerged arc welding consisting essentially of:

| Material | Weight percent | |
|---|---|---|
| | About | To |
| Sodium oxide | 0 | 14 |
| Potassium oxide | 0 | 12 |
| Magnesium oxide | 0 | 22 |
| Calcium oxide | 8 | 45 |
| Manganese oxide | 0 | 12 |
| Aluminum oxide | 0 | 12 |
| Silicon dioxide | 14 | 25 |
| Titanium dioxide | 1 | 8 |
| Calcium fluoride | 10 | 26 | wherein the total of sodium oxide and potassium oxide is about 1 to 14 weight percent and the total of magnesium oxide, calcium oxide, manganese oxide, and aluminum oxide is about 45 to 55 weight percent.

3. A flux suitable for use in submerged arc welding consisting essentially of: about 2.2 weight percent sodium oxide, about 0.5 weight percent potassium oxide, about 10 weight percent magnesium oxide, about 40 weight percent calcium oxide, about 20 weight percent silicon dioxide, about 5 weight percent titanium dioxide, and about 20 weight percent calcium fluoride.

4. A flux suitable for use in submerged arc welding consisting essentially of: about 2.2 weight percent sodium oxide, about 0.5 weight percent potassium oxide, about 10 weight percent magnesium oxide, about 30 weight percent calcium oxide, about 10 weight percent aluminum oxide, about 20 weight percent silicon dioxide, about 5 weight percent titanium dioxide, and about 20 weight percent calcium fluoride.

5. A flux suitable for use in submerged arc welding consisting essentially of: about 2.2 weight percent sodium oxide, about 0.5 weight percent potassium oxide, about 20 weight percent magnesium oxide, about 10 weight percent calcium oxide, about 10 weight percent manganese oxide, about 10 weight percent aluminum oxide, about 20 weight percent silicon dioxide, about 5 weight percent titanium dioxide, and about 20 weight percent calcium fluoride.

6. A flux suitable for use in submerged arc welding consisting essentially of: about 2.2 weight percent sodium oxide, about 0.5 weight percent potassium oxide, about 40 weight percent calcium oxide, about 10 weight percent aluminum oxide, about 20 weight percent silicon dioxide, about 5 weight percent titanium dioxide, and about 20 weight percent calcium fluoride.

References Cited in the file of this patent

UNITED STATES PATENTS

| | | |
|---|---|---|
| 2,043,960 | Jones et al. | June 9, 1936 |
| 2,474,787 | Landis et al. | June 28, 1949 |

FOREIGN PATENTS

| | | |
|---|---|---|
| 691,527 | Great Britain | May 13, 1953 |

Dedication 3,023,133.—*Wallace J. Lewis* and *Glenn E. Faulkner*, Columbus, Ohio. WELDING FLUXES. Patent dated Feb. 27, 1962. Dedication filed May 7, 1973, by the assignee, *The Battelle Development Corporation*.

Hereby dedicates to the People of the United States the entire remaining term of said patent.

[*Official Gazette November 27, 1973.*]